UNITED STATES PATENT OFFICE.

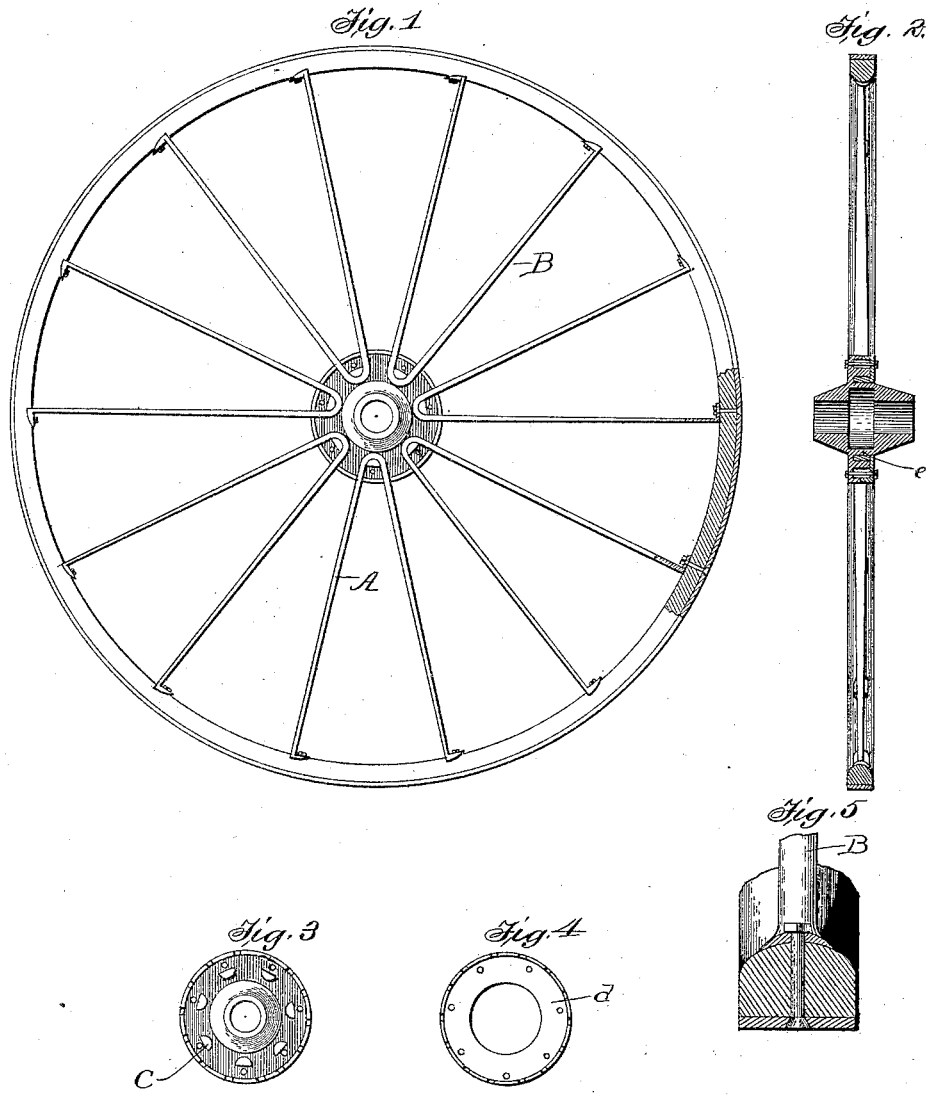

EDWIN CHILDREN, OF EAST DUBUQUE, ILLINOIS.

WHEEL.

SPECIFICATION forming part of Letters Patent No. 465,692, dated December 22, 1891.

Application filed July 31, 1891. Serial No. 401,333. (No model.)

*To all whom it may concern:*

Be it known that I, EDWIN CHILDREN, a citizen of the United States, residing at East Dubuque, in the county of Jo Daviess, State of Illinois, have invented certain new and useful Improvements in Wheels; and I do hereby declare the following to be a full, clear, and exact description of the invention, such as will enable others skilled in the art to which it appertains to make and use the same.

This improved wheel is more especially for use on riding-cultivators and is hereinafter described, reference being had to the accompanying drawings.

In many localities there is a demand for metal wheels, as they are thought to stand exposure better if made the same height as wood wheels usually are. For this purpose they would need to be very heavy to get strength. To avoid this they are made low. Having to work in loose soil this materially adds to the draft. They are apt to cut and slide badly on sidling or uneven ground or listed-corn land, in which cases the wheels of the cultivator are located respectively on the opposite sloping sides of adjacent ridges, between which the corn is planted, in which position the wheel on one side may slip or slide down the side of the mound or ridge, thereby drawing the opposite wheel into the ridge in which it is traveling and as it revolves it will carry up the loose soil, so that when windy it frequently makes it so unpleasant for the operator that he would rather walk than endure it. Very few metal wheels are practical subjects for repairs, and if materially damaged are lost.

In my invention the above objections are largely avoided.

It consists in a combination of parts which I will now proceed to describe.

Figure 1 is a side elevation of my improved wheel, showing the rim partly in section and the cap-plate removed. Fig. 2 is a vertical central section through the wheel. Fig. 3 is a detail view of the hub with the spokes removed. Fig. 4 is a detail view of the cap-plate, and Fig. 5 is a detail cross-section through the rim and the foot of one of the spokes.

The foundation consists of a hub or sleeve having a flange cast thereon, said flange having suitable seats for the spokes and holes for the bolts, as shown, Fig. 2. The plate, Fig. 3, preferably made of malleable iron, is provided with holes for the reception of bolts. It will be understood that the spokes are to be firmly held between the flange and plate by means of suitable bolts. The spokes A and B, Fig. 1, are preferably made from oval steel in pairs suitably tapered toward the ends. At the ends a suitable foot is formed to rest on the rim. Said foot is provided with a hole for the reception of rivet or bolt and having turned-up edges to engage the sides of the spokes. The rim consists of a piece of bent wood surrounded with a light tire, which may be very tightly set, as there are no holes, as in ordinary wood wheels, from which splits are apt to start if the tire is very tightly set. By this method there is no springing of spokes or undue amount of dish in wheel from tightly setting the tire. After the tire is on, holes are provided for reception of rivets or bolts by which the spokes are joined to the rims.

Having thus generally described the several parts, I will now describe the manner of uniting the same. Holes are drilled through the tire and bored through the rim. The feet of the spokes are then adjusted to their right positions. A bolt or rivet is then inserted through the tire and rim and through the opening in the foot. The foot is securely attached by riveting the end of the rivet or putting a nut on the bolt. The inner ends of the spokes are then placed over the spoke-seats *c* in the hub and extended through the grooves in the flange of the hub, and the outer plate *d* is then bolted tightly onto the opposite side of the spoke, forcing the same onto the seat and tightly uniting the parts. It will be noticed, as shown in Fig. 4, that the plate B has a series of grooves in the flange thereof, which, in connection with the grooves on the flange of the hub, form the openings through which the spokes pass into the hub, as well as the means for tightly binding the spokes between the flanges. By reference to Fig. 2 it will be noticed that the inner end of the spoke rests on the wall *e*, forming the outer wall of the grease-chamber.

It is to be understood that I do not limit myself to the use of a double spoke as a single spoke may be used.

By using a wood rim I largely overcome the sliding of the wheel and lifting of the dirt.

Having thus described my invention, what I claim, and desire to secure by Letters Patent, is—

1. A wheel consisting of a two-part hub, each part having grooved flanges on its edge, bolts for securing the parts together, tapered spokes having their enlarged ends secured in the grooves and between the flanges, and their smaller outer ends bent at right angles and curved in cross-section, a wooden felly having a curved inner face resting on the right-angled extension of the spokes, and a metal tire having bolts passing through the tire, felly, and right-angled extensions, substantially as described.

2. A riding-cultivator wheel consisting of a hub and tapered metal spokes having their large ends secured in the hub and their outer reduced ends bent at an angle and formed into a foot, a wooden felly having a sloping inner face between the spokes, a metal tire, and fasteners passing through the tire, felly, and feet on the spokes, substantially as described.

EDWIN CHILDREN.

Witnesses:
R. E. ODELL,
A. G. CHILDREN.